Sept. 7, 1926.
W. J. HORTON
WEED ERADICATOR
Filed July 5, 1924
1,598,724
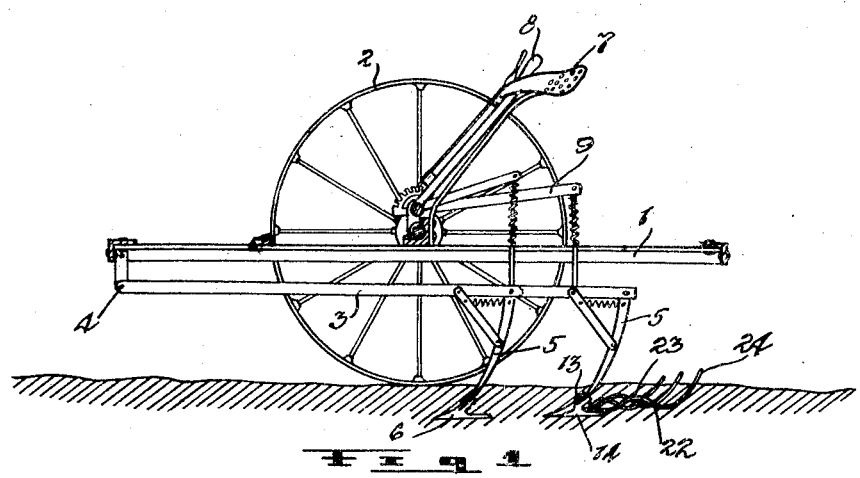
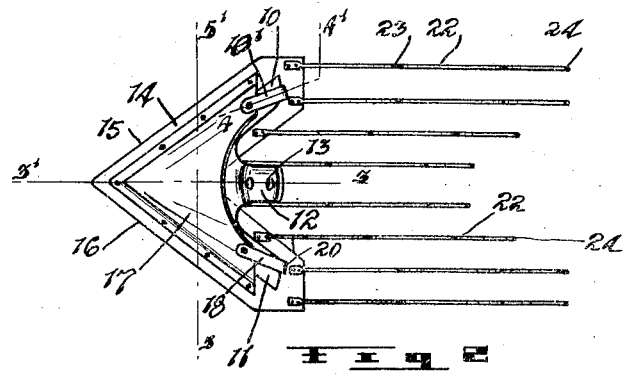
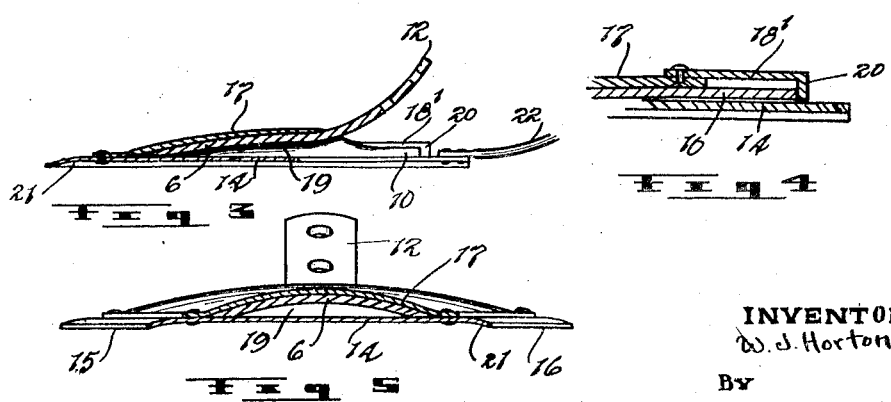
INVENTOR
W. J. Horton
By Patented Sept. 7, 1926.

1,598,724

UNITED STATES PATENT OFFICE.

WILLIAM JAMES HORTON, OF WINNIPEG, MANITOBA, CANADA.

WEED ERADICATOR.

Application filed July 5, 1924. Serial No. 724,441.

The invention relates to improvements in weed eradicators and an object of the invention is to provide a device which will effectively cut the soil, loosen and separate the weeds therefrom and leave the weeds lying on the ground surface.

A further object of the invention is to provide a device particularly adapted to eradicating sow-thistle, quack grass and other such obnoxious growths.

A further object is to provide a weed eradicator in the form of a shoe which can be attached to the present types of stiff teeth cultivators, thereby permitting the farmer to use his cultivator with my attachment to eradicate weeds.

A further object is to construct the device in a simple, durable and inexpensive manner and so that it can be readily attached to or dismounted from the teeth of the cultivator.

With the above more important objects in view the invention consists essentially in the arrangement and construction of parts hereinafter more particularly described, reference being had to the accompanying drawing, in which:—

Fig. 1 is a vertical sectional view through a stiff tooth cultivator, parts being shown in side elevation and the cultivator being equipped with my invention.

Fig. 2 is a plan view of my improved shoe.

Fig. 3 is an enlarged detailed vertical sectional view at 3—3' Fig. 2.

Fig. 4 is an enlarged detailed vertical sectional view at 4—4' Fig. 2.

Fig. 5 is an enlarged detailed vertical sectional view at 5—5' Fig. 2.

In the drawing like characters of reference indicate corresponding parts in the several figures.

In the present disclosure I have shown a stiff tooth cultivator of the ordinary type equipped with my invention, but in this connection I wish it to be distinctly understood that a separate machine can be built and equipped with my shoes, as in so far as their work is concerned it is only necessary that they be held in working position in the ground.

The stiff tooth cultivator which is of the usual form presents a substantially rectangular frame 1 which is supported by the customary ground wheels, one of which is shown at 2. To the forward end of the frame, pairs of rearwardly extending bars 3 are pivotally connected at 4 and the rear ends of the bars 3 carry shanks 5 which extend downwardly towards the ground and are fitted with teeth 6. The frame carries a seat 7, adjoining which there is an adjusting lever 8 and the adjusting lever operates through suitable cranks 9 provided to apply pressure on the rear ends of the bars 3, and in so doing hold the teeth into the ground.

A more detailed description of the stiff tooth cultivator is not herein given as such a machine is well known to those familiar with farming operations.

Different types of teeth 6 are provided for stiff tooth cultivators, and in the present instance I have shown the type of tooth known as the duck foot, such being in the form of a pointed or V-shaped inclining plate provided with similar inclined side wings 10 and 11 and a central attaching tongue 12 which is secured, as by bolts as indicated at 13, to the lower ends of the shanks 5.

Stiff tooth cultivators are usually provided with front and rear sets of staggered teeth and I find it desirable to attach my shoes on the rear set of teeth, the front set being then used to cut the soil, and the rear set with my shoes thereon, being used to separate the weeds and leave them lying on the ground surface.

The above arrangement is shown in the present drawings, and in the following description it will be understood that each rear tooth is fitted with a shoe as now described.

The shoe comprises a substantially V-shaped bottom plate 14 forming a blade which presents forwardly converging cutting edges 15 and 16, and to the top side of the blade a V-shaped retaining plate 17 is riveted, the body of the plate being spaced from the blade to provide an interior pocket 19 which is designed to receive the tooth of the cultivating machine.

In the present instance the pocket of the shoe is adapted to receive the duck foot, as it is called, and the inserted duck foot is held against withdrawal by a pair of similar pivoted latches 18 and 18' attached to the rear edge of the plate 17 and having hooked ends as indicated at 20 adapted to catch behind the rear ends of the wings 10 and 11. The forward edges of the plate 14 are slightly downturned as indicated at 21.

To the rear edge of the plate 14 I attach permanently as by riveting a plurality of similarly shaped trailing prongs 22, the prongs being parallel and extending approximately across the full width of the shoe. Each prong presents a centrally disposed hump 23 and an upturned combing and discharging end 24, and when the shoe is in use the hump operates below the ground surface and the rear extremity of the prong extends somewhat above the ground.

The rear edge of the plate 14 is of a V-shape and the prongs are secured to such rear edge. The prongs accordingly appear in a V-shaped formation with the result that the humps and the trailing ends of the prongs are irregularly disposed.

When it is desired to equip a stiff tooth cultivator such as that shown with my shoes the latches are swung to the side and a shoe is placed upon each tooth of the rear set. This being done the latches are swung back to catch behind the rear ends of the wings.

When the machine is in use the weeds are cut by the front set or row of teeth 6, and the cut weeds are caught by the shoes and passed over the prongs. The weeds and soil are separated or loosened by being passed over the humps of the prongs and the loosened earth passes back between the prongs, whilst the weeds are caught by the upturned or hooked ends of the prongs and passed to the ground's surface where they discharge on to the soil cultivated.

I might point out that the teeth in the rows of a stiff tooth cultivator are usually spaced apart, the soil passing through the front set of teeth being operated upon by the teeth of the rear set of cultivators. When my shoes, however, are applied on the rear set of teeth the outer extremities or ends of the adjacent shoes are practically touching so that the soil for the complete width of the machine is acted upon by my cultivators, there being no room for any to escape between.

Whilst I have shown the pocket in the shoe of a shape to receive the duck foot it will be readily understood that the pocket can be readily formed to receive any of the various types of teeth used on stiff tooth cultivating machines as it is only a matter of shaping the plate 17 to accommodate the particular tooth utilized. Further it will be obvious that the shoe and the trailing teeth could be mounted directly on carrying shanks of their own and by so doing a machine could readily be developed and used to advantage.

What I claim as my invention is:—

The combination with a shank and a duck foot cultivator tooth secured to the lower end thereof, of a weed eradicator comprising a substantially V-shaped flat lying plate forming a blade presenting forwardly converging cutting edges, said blade underlying the cultivator tooth, a retaining plate secured permanently to the blade and forming therewith an interior pocket receiving the tooth, means releasably holding the tooth within the pocket and a plurality of similar spaced rearwardly extending prongs secured to the rear edge of the V-shaped plate, said prongs being bent vertically in a zig-zag manner and having their rear ends inclining upwardly.

Signed at Winnipeg, this 8th day of January 1924.

WILLIAM JAMES HORTON.